United States Patent [19]

De Freitas et al.

[11] Patent Number: 4,885,149

[45] Date of Patent: Dec. 5, 1989

[54] RECOVERY AND PURIFICATION OF SILICA

[75] Inventors: Anthony S. W. De Freitas; Archibald W. McCulloch; Alister G. McInnes, all of Halifax, Canada

[73] Assignee: Canadian Patents and Development Limited/Societe Canadienne des Brevets et D'Exploitation Limited, Canada

[21] Appl. No.: 131,026

[22] Filed: Dec. 9, 1987

[30] Foreign Application Priority Data

Dec. 16, 1986 [CA] Canada .................................. 525427

[51] Int. Cl.$^4$ ............................................. C01B 33/12
[52] U.S. Cl. ..................................... 423/339; 423/335
[58] Field of Search ................................ 423/339, 335

[56] References Cited

FOREIGN PATENT DOCUMENTS 3602183 5/1987 Fed. Rep. of Germany .
1292459 5/1961 France ................................ 423/339

OTHER PUBLICATIONS

Strickland, Journal of American Chemical Society, 1952, 74, pp. 862, 868 and 872.
Strickland, Chemistry and Industry, 5/20/50, p. 393.
Chemical Abs. 107, 161307y.

Primary Examiner—John Doll
Assistant Examiner—Lori S. Freeman
Attorney, Agent, or Firm—Pasquale A. Razzano

[57] ABSTRACT

A process for preparing silica comprising:
(a) acidifying a basic aqueous solution containing silicate ions and molybdate ions to produce silicomolybodic acid;
(b) adding to the acidified solution an organic base to precipitate a silicomolybdate; and,
(c) heating the resulting precipitate to drive off volatile components and leave a purified form of silica is disclosed. The process is particularly useful for producing purified silica from dilute aqueous media.

17 Claims, No Drawings

RECOVERY AND PURIFICATION OF SILICA

BACKGROUND TO THE INVENTION

This invention relates to processes for recovery and purification of silica.

There is a current need for pure silica. Both high-purity silica, used as a filler for plastic-moulded semiconductor devices, and high-purity silicon, used in solar cells and silicon chips, are required for diverse industrial applications. It would also be useful to be able to recover and selectively remove silicate from aqueous media (for example, silicon isotope recovery), particularly when present in low concentrations. Traditionally silica has been recovered from aqueous silicate solutions at low pH by precipitation. Procedures for purification of silicon or silica include:

(i) powdering and acid-leaching of metallurgical grade silicon followed by passage through an induction plasma. On solidification impurities migrate to the surface of granules and can be leached;

(ii) acid leaching of metallurgical silicon followed by chlorination at 1500° C. and final zone refining;

(iii) vacuum refining at 1500° C. and fluxing at 1410° C. with the fluoride of an alkaline earth or alkali metal;

(iv) aluminothermic reduction of quartz sand in a calcium silicate slag at 1550° C.

(v) carbothermic reduction of silica in an electric arc; or (vi) pyrolysis of silicon hydride.

Traditional silica precipitation methods are not well suited to the recovery of low concentrations of soluble silicate. Most purification methods suffer from a lack of selectivity in element removal, and involve time-consuming and expensive multistep procedures.

The formation of silicomolydbates has been reported by Truesdale and Smith in The Analyst, 101; 19 (1976). Precipitation of silicomolybdates by organic bases for analytical purposes has been described by MacDonald et al in The Analyst, 93, 65 (1968) and Piryutko et al in Chem. Abs. 95, 143516v. Tetraalkylammonium silicomolybdates are discussed in Filowitz et al, J. Amer. Chem. Soc. 98, 2345 (1976).

SUMMARY OF THE INVENTION

According to the present invention there is provided a process for obtaining silica which process comprises:

(a) acidifying a basic aqueous solution containing silicate ions and molybdate ions to produce silicomolybdic acid;

(b) adding to the acidified solution an organic base to precipitate a silicomolybdate; and (c) recovering from the precipitate of step (b) a purified form of silica.

DETAILED DESCRIPTION OF THE INVENTION

In step (a) of the process it is preferred that the aqueous solution contains between 5 and 1000 ppm of silicon. Basic sodium silicate is particularly preferred.

It is preferred that the pH of the acidified solution be between about 1.5 and 2.0, more preferably about 1.5. The pH is preferably adjusted with sulfuric acid although other acids can be used.

In step (b) the organic base is preferably a trialkylammonium or tetraaklylammonium counterion. The trialkylammonium counterion may be in the form of a trialkylamine hydrohalide such as the hydrochloride. A triethylammonium counterion has been found useful.

The tetraalkylammonium counterion preferably contains $C_1$ to $C_4$ alkyl groups. The tetramethylammonium, tetraethylammonium and tetrabutylammonium counterions are especially preferred. The tetraalkylammonium counterion is preferably in the form of a halide or the hydrogen sulfate addition salt. The bromide is the halide of choice.

To produce high purity silica it is to be preferred that a washing step be included between step (b) and step (c) e.g. washing with an acid, such as 1N nitric acid, and then with deionized water.

A preferred embodiment of the invention is a process for preparing purified silica which comprises:

(a) mixing basic sodium silicate containing 5 to 1000 ppm of silicon with stoichiometrically sufficient ammonium molybate;

(b) acidifying the mixture resulting from step (a) with 2N sulfuric acid to a pH of 1.5;

(c) adding sufficient concentrated aqueous solution of tetrabutylammonium bromide to the product of step (b) to allow complete precipitation to occur;

(d) filtering the product of step (c) to recover a precipitate;

(e) washing the precipitate resulting from step (d) with 1N nitric acid and then with deionized water;

(f) drying the precipitate resulting from step (e); and (g) heating the product of step (f) stepwise to about 350° C. and then to about 1000° C. to leave a residue of purified silica.

In such a preferred embodiment tetrabutylammonium hydrogen sulfate, tetraethylammonium bromide, tetramethylammonium bromide or triethylamine hydrochloride can be used instead of tetrabutylammonium bromide.

EXAMPLE 1

To aqueous sodium silicate was added ammonium molybdate and the pH was then adjusted to 1.5 with 2N sulfuric acid. Formation of silicomolybdic acid was evidenced by a yellow colour. The reaction mixture was stirred for over an hour at room temperature.

Concentrated tetrabutylammonium bromide was then added. This produced an immediate precipitation of yellow tetrabutylammonium silicomolybdate. Colourless tetrabutylammonium molybdate was also formed as a result of reaction of excess reagents and co-precipitated. The mixture was allowed to stand overnight to ensure complete precipitation.

The precipitate was then filtered, washed thoroughly with 1N nitric acid and then with deionized water, and then air dried at 45° C. The dry solid which resulted was placed in a quartz boat and combusted in a quartz tube in a gentle stream of air by, first, being heated to about 350° C. for about 20 minutes to decompose the salt and eliminate the organic component and, secondly, being subsequently heated to about 1000° C. for about 60 minutes to volatilize molybdenum oxide (which sublimes). A residue of silica was left.

It was found that stepwise combustion should be used. This involves an initial combustion at 350° C. for about 20 minutes, to remove the organic component. Uncontrolled, and violent, decomposition of the organic component may occur if the temperature is raised too quickly above 400° C. The second combustion step involves a subsequent temperature increase of 30° C./min. from 350° C. to 1000° C., followed by a hold at 1000° C. for 60 minutes. Although molybdenum oxide sublimes above 800° C., the combustion at 1000° C. is required for effective separation of the silica.

Recovery of silica is essentially complete. Preliminary tests indicate that most elements (e.g. Ca, Mg, Al, Na, K, Ba, Zn, Fe) are effectively removed.

EXAMPLE 2

The procedure was the same as that followed in Example 1 except that tetrabutylammonium hydrogen sulfate was employed instead of tetrabutylammonium bromide. Similar results to Example 1 were obtained.

EXAMPLE 3

Biogenic silica from diatom shells was dissolved in aqueous sodium hydroxide and then submitted to a similar procedure to that exemplified in Example 1. Neutron activation analyses of the silica substrate and product showed 100% removal of calcium (original concentration 700 ppm), magnesium (original concentration 1200 ppm), barium (original concentration 100 ppm) and titanium (original concentration 400 ppm), greater than 90% removal of manganese (original concentration 50 ppm) and uranium (original concentration 8 ppm) and greater than 85% removal of copper (original concentration 325 ppm).

EXAMPLE 4

The procedure was the same as that followed in example 1 except that tetraethylammonium bromide was employed instead of tetrabutylammonium bromide. Similar results to Example 1 were obtained.

EXAMPLE 5

The procedure was the same as that followed in Example 1 except that triethylamine hydrochloride was employed instead of tetrabutylammonium bromide. Similar results to Example 1 were obtained. (In this case triethylammonium molybdate is watersoluble and does not co-precipitate).

EXAMPLE 6

The procedure was the same as that followed in Example 1 except that tetramethylammonium bromide was employed instead of tetrabutylammonium bromide. Similar results to Example 1 were obtained.

Advantages of this process include:

(1) precipitation of the silicomolybdate derivative is close to quantitative, even at low silicon concentration;

(2) most contaminants remain in aqueous solution and are removed by filtration. Other contaminants are removed during subsequent acid washing of the precipitate;

(3) during combustion at about 350° C. the organic component is destroyed while the molybdenum sublimes as the trioxide at 1000° C.;

(4) although elements such as phosphorus and arsenic, which form similar derivatives $H_3PMo_{12}O_{40}$ and $H_3AsMo_{12}O_{40}$, will also be precipitated under similar conditions, the oxides of these elements are much more volatile than silica and hence are removed during combustion;

(5) a wide variety of organic bases may be used to precipitate the silicomolybdate; and (6) costly isotopes of silicon can be recovered from dilute aqueous solutions.

We claim as our invention:

1. A process for obtaining silica which process comprises:

(a) acidifying a basic aqueous solution containing silicate ions and molybdate ions to bring the pH of the solution to no more than 2 and to produce silicomolybdic acid;

(b) adding to the acidified solution an organic base containing a trialkylammonium or tetraalkylammonium counterion, said counterion containing $C_1$ to $C_4$ alkyl groups to precipitate a silicomolybdate; and (c) washing and drying the precipitate of step (b) and then heating the precipitate stepwise to about 350° C. and then to about 1000° to drive off volatile impurities and leave a residue of silica.

2. The process of claim 1 wherein the aqueous solution of step (a) contains 5 to 1000 ppm of silicon.

3. The process of claim 1 wherein the silicate is in the form of basic sodium silicate.

4. The process of claim 1 wherein the pH of the acidified solution is adjusted to between about 1.5 and 2.0.

5. The process of claim 1 wherein in step (b) the pH is adjusted to about 1.5.

6. The process of claim 1 wherein in step (b) the pH is adjusted with sulfuric acid.

7. The process of claim 1 wherein said trialkylammonium counterion is a triethylammonium cation.

8. The process of claim 7 wherein said trialkylammonium counterion is in the form of a trialkylamine hydrohalide.

9. The process of claim 8 wherein said trialkylamine hydrohalide is a trialkylamine hydrochloride.

10. The process of claim 1 wherein said tetraalkylammonium counterion is a tetramethylammonium, tetraethylammonium or tetrabutylammonium cation.

11. The process of claim 1 wherein said tetraalkylammonium counterion is a tetrabutylammonium cation.

12. The process of claim 1 wherein said tetraalkylammonium counterion is in the form of a tetraalkylammonium halide.

13. The process of claim 12 wherein said tetraalkylammonium halide is a bromide.

14. The process of claim 1 wherein said tetraalkylammonium counterion is in the form of tetraalkylammonium hydrogen sulfate.

15. The process of claim 1 wherein the precipitate resulting from step (b) is washed with acid and then washed with deionized water.

16. The process of claim 1 wherein the precipitate resulting from step (b) is washed with 1N nitric acid and then washed with deionized water.

17. A process for preparing purified silica which comprises (a) mixing basic sodium silicate containing 5 to 1000 ppm of silicon with stoichiometrically sufficient ammonium molybdate;

(b) acidifying the mixture resulting from step (a) with 2N sulfuric acid to a pH of about 1.5;

(c) adding sufficient concentrated aqueous solution of a compound selected from the group consisting of tetrabutylammonium bromide, tetrabutylammonium hydrogen sulfate, tetraethylammonium bromide, triethylamine hydrochloride and tetramethylammonium bromide, to the product of step (b) to allow complete precipitation to occur;

(d) filtering the product of step (c) to recover a precipitate;

(e) washing the precipitate resulting from step (d) with 1N nitric acid and then with deionized water;

(f) drying the precipitate resulting from step (c); and (g) heating the product of step (f) stepwise to about 350° C. and then to about 1000° C. to leave a residue of silica.

* * * * *